Feb. 2, 1960 E. H. BADGER, JR., ET AL 2,923,314
TANK FILLING VALVE WITH PRESSURE SURGE CONTROL
Filed Sept. 26, 1955 3 Sheets-Sheet 1

EVERETT H. BADGER, JR.
ALBERT W. BROWN
INVENTORS

BY Lyon & Lyon
ATTORNEYS

Feb. 2, 1960 E. H. BADGER, JR., ET AL 2,923,314
TANK FILLING VALVE WITH PRESSURE SURGE CONTROL
Filed Sept. 26, 1955 3 Sheets-Sheet 2
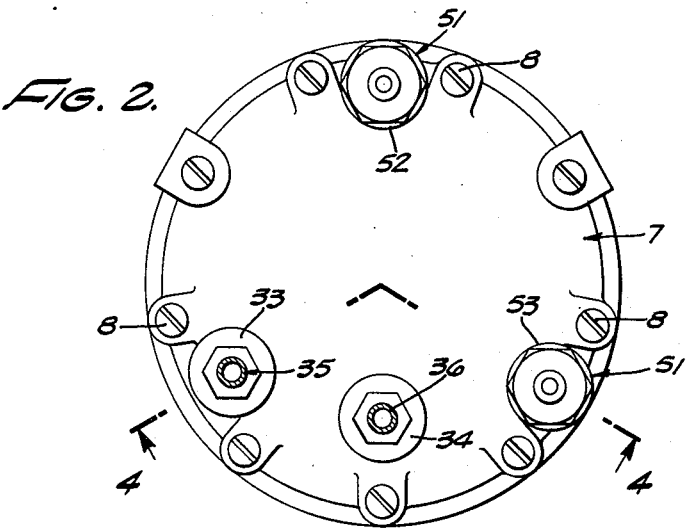
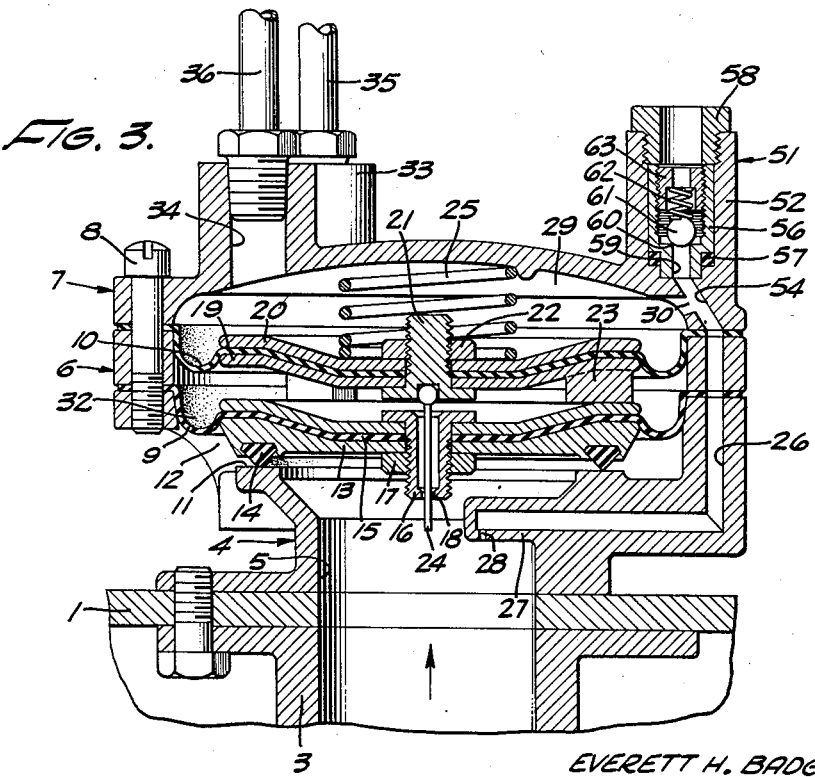
EVERETT H. BADGER, JR.
ALBERT W. BROWN
INVENTORS
BY Lyon & Lyon
ATTORNEYS Feb. 2, 1960 E. H. BADGER, JR., ET AL 2,923,314
TANK FILLING VALVE WITH PRESSURE SURGE CONTROL
Filed Sept. 26, 1955 3 Sheets-Sheet 3

EVERETT H. BADGER, JR.
ALBERT W. BROWN
INVENTORS

BY Lyon & Lyon
ATTORNEYS

United States Patent Office 2,923,314
Patented Feb. 2, 1960

2,923,314

TANK FILLING VALVE WITH PRESSURE SURGE CONTROL

Everett H. Badger, Jr., near Whittier, and Albert W. Brown, Manhattan Beach, Calif., assignors to Parker Hannifin Corporation, a corporation of Ohio Application September 26, 1955, Serial No. 536,346

4 Claims. (Cl. 137—414)

This invention relates to tank filling valves which shut off a supply line when a tank has been filled with liquid to a predetermined level, and more particularly to valves of this type which include a fluid pressure operated main valve controlled by a pilot valve which closes when the liquid in the tank has reached a predetermined level.

In valves of this type the liquid in the supply line is bled to a chamber behind the main valve and out through the pilot valve. When the liquid in the tank reaches the predetermined level, the pilot valve closes and the liquid pressure in the chamber behind the main valve then builds up and causes the latter to close. The pilot valve is usually operated by a float, but may be operated by other suitable means.

The present invention has particular application in aircraft installations but may also be used to advantage in other applications. To minimize fueling time in aircraft, the tank filling valves have large flow capacities and the fuel is supplied through relatively large diameter conduits and at pressures which exceed the strength of the tank. Thus, it is essential that the filling valves shut off rapidly and dependably when the liquid has reached a predetermined level to prevent overfilling and bursting of the tank.

Although a rapid shutoff of the main valve is desirable in order to maintain accurate control of the filling level, there is also a potential disadvantage in that rapid shutoff may cause momentary excessive surges in the supply line due to the sudden stopping of the liquid flow. Such pressure surges, if not controlled within predetermined limits, can cause damage to the supply system.

The magnitude and duration of such pressure surges are dependent on a number of factors in addition to the valve closing time, including such items as the mass or volume of the moving liquid in the supply line, the velocity through the supply line, operation of auxiliary controls (such as pump shutoff), and others.

These additional factors vary considerably from one aircraft fueling unit or system to another and, although it would be possible to design the tank filling valve to shut off slowly enough to prevent excess pressure surges under the most extreme conditions encountered, it is not practical to do so because the closing time would be too slow for accurate control of the filling level. It is therefore an object of the present invention to provide a tank filling valve in which a rapid shut-off time is normally provided but with provision for extending the time, or for reopening the valve momentarily, upon development of a predetermined pressure rise in the inlet line, and by this means preventing the pressure rise from becoming excessive.

It is another object to provide a pressure surge control device of the type described as an integral part of the tank filling valve.

It is another object to provide a fluid pressure operated filling valve with a means to suppress pressure surges in the supply line by decreasing the closing rate of the valve, or by reopening the valve momentarily, when surge pressures in the supply line reach a predetermined value, and yet permit the valve to be finally closed in a minimum time consistent with the suppression of such pressure surges.

It is a more particular object to provide a device of this type for use in conjunction with dual diaphragm and dual float operated pilot valves of the type disclosed in the copending patent application of R. H. Davies and Frederick E. Amon, Serial No. 290,226, filed May 27, 1952, which issued as Patent No. 2,811,168 on October 29, 1957.

With the above and other objects in view, as may appear hereinatfer, reference is directed to the accompanying drawings in which:

Fig. 2 is a transverse sectional view through 2—2 of Fig. 1, showing the tank filling valve in plan;

Fig. 3 is a transverse sectional view through the tank filling valve, taken along the line 3—3 of Fig. 1;

Figure 1:
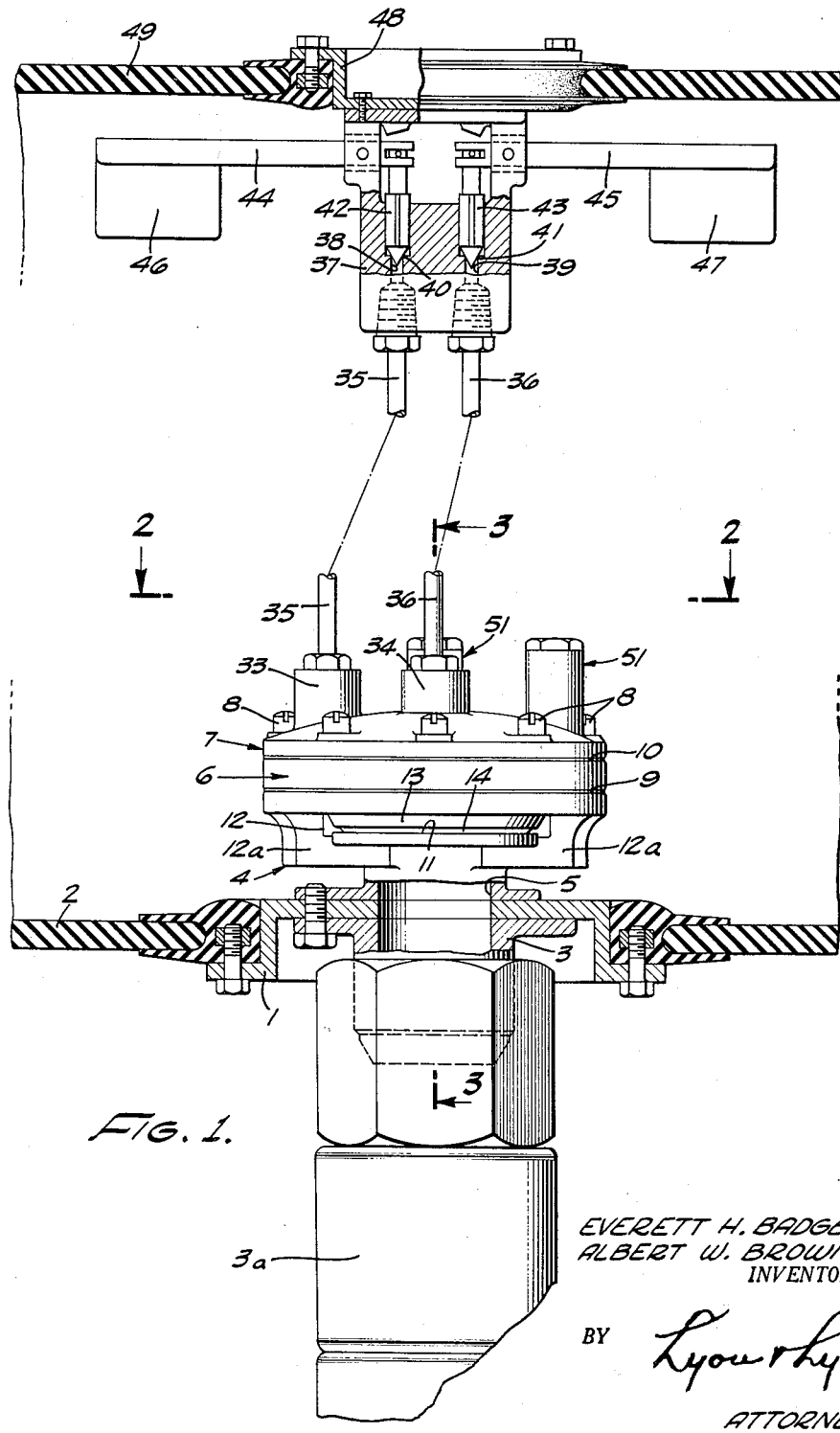
Figure 1 is a partial sectional, partial elevational view showing a tank filling valve and its float-operated pilot valve, the tank being shown fragmentarily and in section.

The pressure relief device is incorporated in a tank filling valve. The tank filling valve is mounted within the lower portion of a fuel tank by means of a mounting flange 1, set in an opening in the bottom wall 2 of a tank.

The flange 1 is provided with an inlet fitting 3 connected to a conduit 3a. Secured to the opposite side of the mounting flange 1 from the inlet fitting 3 is a housing base 4 having an inlet passage 5. Seated on the housing base 4 is a housing ring 6, and fitting on the housing ring 6 is a housing cap 7. The housing base, ring, and cap form a housing structure connected by bolts 8.

Interposed between the housing base 4 and the housing ring 6 is a lower diaphragm 9. Interposed between the housing ring 6 and housing cap 7 is an upper diaphragm 10. The diaphragms 9 and 10 may be similar in construction.

The upper end of the inlet passage 5, within the housing base 4, is provided with a valve seat 11 confronting the lower diaphragm 9. Radially outwardly of the valve seat 11 the housing base is provided with discharge openings 12 formed between webs 12a joining the upper and lower portions of the housing base 4. Centrally located on the underside of the lower diaphragm is a valve disc 13 which carries a seal ring 14 engageable with the valve seat 11. The central portion of the lower diaphragm 9 is clamped between the valve disc 13 and a plate 15 by means of a tubular stem 16 and nut 17. The stem 16 is provided with a small orifice 18 at its lower end, forming restricted communication across the lower diaphragm 9.

The central portion of the upper diaphragm 10 is clamped between a bottom plate 19 and a top plate 20 by means of a stem 21 and nut 22. The bottom plate 19 is provided with feet 23 which space the upper diaphragm 10 from the lower diaphragm 9.

A wiping pin 24 is loosely retained by the stem 21 and extends downwardly through the orifice 18 of the stem 16 and serves to prevent clogging of the orifice.

A spring 25 is interposed between the upper diaphragm 10 and the housing cap 7. The spring urges the diaphragms 9 and 10 downward so that the seal ring 14 of the lower diaphragm structure normally engages the valve seat 11. The effective areas of the upper and lower diaphrgams are substantially equal to each other and are greater than the area defined by the seal ring 14, so that if the pressure above the diaphragms is equal to the pressure existing in the inlet passage 5 the seal ring 14 is maintained in its closed position against the valve seat 11.

Formed in the side walls of the housing base 4, ring 6, and cap 7, is a bleed passage 26. Within the housing base the bleed passage extends radially into a hollow projection 27 protruding into the inlet passage 5. At this end of the bleed passage 26 there is provided a small orifice 28. The end of the bleed passage 26 within the housing cap 7 communicates with a pressure chamber 29 formed between the housing cap 7 and upper diaphragm 10 through a port 30.

The side wall of the housing cap 7 and housing ring 6 is provided with a second bleed passage 31, the lower end of which communicates with a second pressure chamber 32 located between the diaphragms 9 and 10. The upper end of the bleed passage 31 communicates with a bleed outlet in the form of a hollow boss 33 directed upwardly from the housing cap 7. A similar bleed outlet 34 extends upwardly from the pressure chamber 29.

The bleed outlets 33 and 34 are connected by bleed lines 35 and 36 to a pilot valve housing 37. The pilot valve housing is provided with parallel pilot bores 38 and 39 having valve seats 40 and 41 therein which are engaged by pilot valve plungers 42 and 43.

The pilot valve plungers 42 and 43 are operated by float levers 44 and 45 pivotally supported by the pilot valve housing 37 and having floats 46 and 47 at their extended ends. The upper end of the pilot valve housing 37 is suitably attached to a mounting flange 40 secured within the upper wall 49 of the fuel tank.

Operation of the tank filling valve thus far described is as follows:

On opening both pilot valve plungers 42 and 43, fluid is bled through the orifices 18 and 28 and the associated bleed passages to relieve the pressure in the pressure chambers 32 and 29, permitting the seal ring 14 to move upwardly away from the valve seat 11 in response to liquid fuel entering the inlet passage 5 under pressure. When the fuel tank is filled, closure of either pilot valve plunger 42 or 43 causes a pressure to build up in either the pressure chamber 32 or 29 and in either case will cause the seal ring 14 to engage the valve seat 11. The orifices 18 and 28 provide a predetermined rate of flow of liquid into the pressure chambers 32 and 29 at any given supply line pressure. However, the supply line pressures are variable in different supply units and systems so that the closing rate will vary. Furthermore, as the valve disk 13 closes to stop the flow of fuel in the supply line, there will be a rapid momentary increase in the supply line pressure due to the inertia of the fuel. The inertia can vary considerably due to variations in the lengths, diameters, pressure drop, and so forth in the supply line in various installations and the greater the inertia, the greater will be the pressure rise for any given valve closing rate. As the pressure in the supply line goes up, the greater will be the flow through the orifices 18 and 28 and the pressure within the chambers 32 and 29, and hence the valve 13 will try to close still faster. This in turn tends to make the supply line pressure become still higher which causes the valve 13 to close faster yet. As a result, very high, although momentary, pressure surges can develop as the valve closes.

Figure 4:
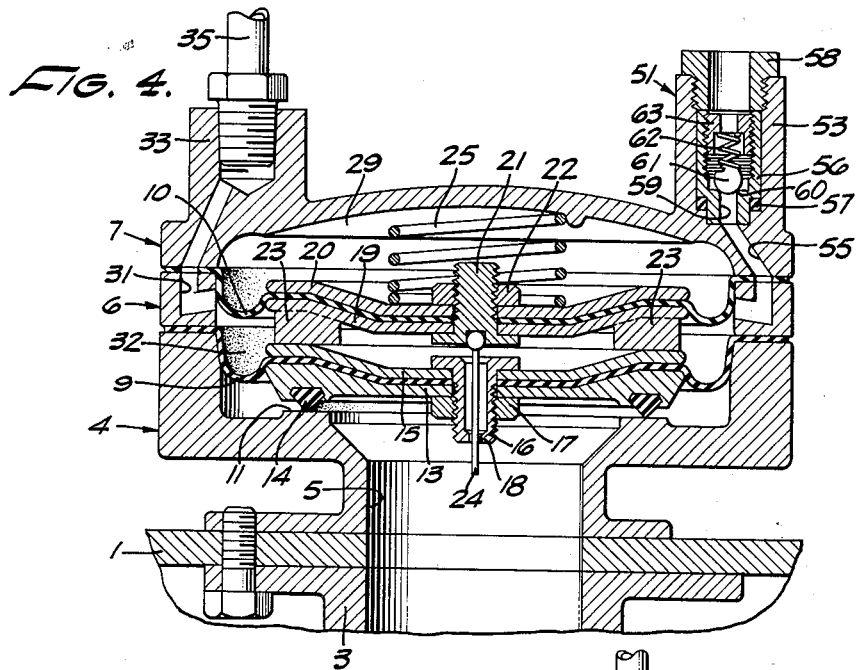
Fig. 4 is another transverse sectional view of the tank filling valve, taken through 4—4 of Fig. 2.
Figure 5:
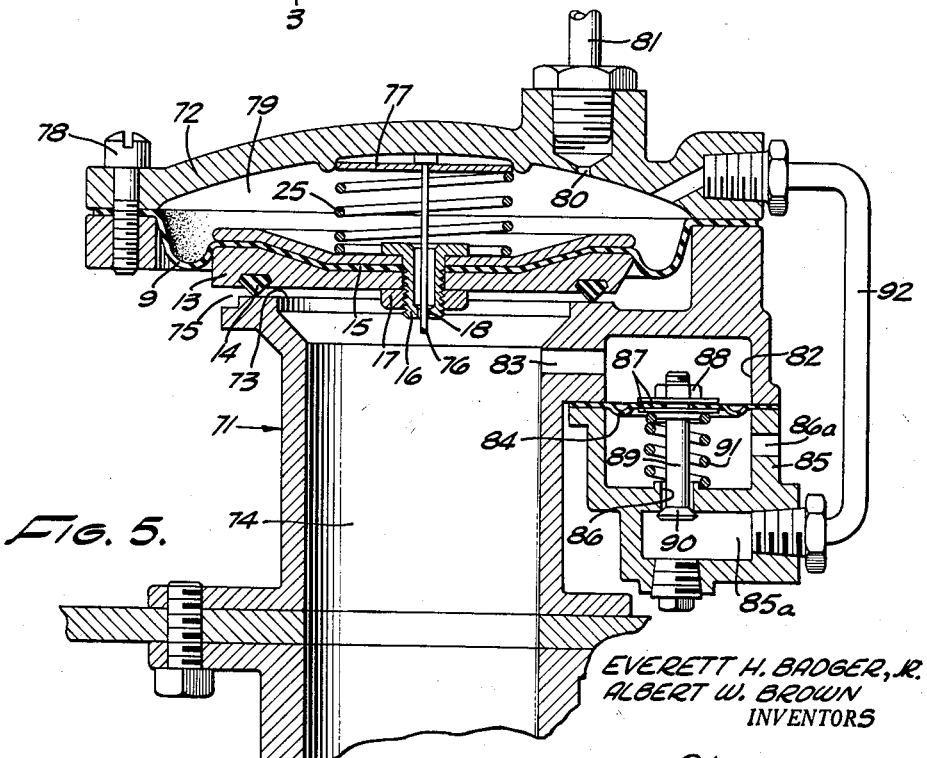
Fig. 5 is a transverse sectional view similar to Fig. 2, showing a modified form of the tank filling valve.

Although the orifices 18 and 28 could be so designed that they would restrict the flow into the chambers 32 and 29 to such an extent that valve closing would be slow enough under maximum inertia conditions of the supply fluid to prevent excessive surge pressures from developing, it is obvious that such slow closing would be in contradiction to the rapid closing desired for accurate control of the filling level. Consequently, the present invention provides a means for permitting rapid closing as long as pressure surges do not exceed a predetermined maximum but which will function to decrease the closing rate, or for momentarily reopening the valve, as may be required to prevent excess surge pressures from developing. A preferred means for accomplishing this is illustrated in Figures 1 through 4 and an optional method is shown in Figure 5.

In the form shown in Figures 1 through 4, a pressure responsive valve is in communication with the supply line and a respective pressure chamber 29 or 32 and is effective for preventing pressure surges in the supply line beyond a predetermined value from being transmitted to the pressure chamber. Two such pressure responsive devices, designated 51, are employed, one for each of the chambers 29 and 32. These devices are mounted within housing extensions 52 and 53 of the housing cap 7.

The housing extension 52 shown in Figure 3 is in the form of a tubular member having an inlet port 54 communicating with the bleed passage 26, which bypasses the chamber 29. The housing extension 53, shown in Fig. 4, is also a tubular member and communicates through a passage 55 extending substantially axially in the wall of the housing cap 7 and housing ring 6 to the pressure chamber 32. Internally, each housing extension is identical to the other. Each housing extension receives a tubular valve body 56 which seats in the lower end of the housing extremity and is encircled by a seal ring 57. A tubular retainer screw 58 secures the valve body in place.

The valve body 56 has a bore 59 which is provided with an upwardly directed seat 60, which is engaged by a ball valve element 61 backed by a spring 62, the force of which is adjusted by a tubular adjustment screw 63.

Operation of the pressure responsive devices is as follows:

Under normal conditions, that is, conditions within the range determined by the orifices 18 and 28, the pressure responsive devices do not function. However, if during the closing movement of the tank filling valve excessive pressure surge should occur in the inlet 5, this pressure is transmitted through the orifice 28 and bleed passage 26 to one of the pressure responsive devices in the housing 52 and is simultaneously transmitted through the orifice 18, pressure chamber 29, and passage 55 to the other pressure responsive device in the housing extension 53 and thereby causing both of the valve elements 61 to open.

The communication afforded by the pressure responsive devices between the pressure chambers and the interior of the fuel tank is in excess of the capacities of the orifices 18 and 28 and thus the fluid will tend to pass through the pressure responsive devices faster than it can pass through the orifices 18 and 28 and thus prevent a rise in pressure in the chambers 29 and 32. The pressure surge in the inlet 5 will, of course, react to some extent on the underside of the valve disk 13 tending to move it away from a closed position. Since there is no corresponding increase in pressure on the back side of the valve disk 13 from the pressure of the fluid in chambers 29 and 32, the valve disk 13 will be momentarily delayed, or even reversed, in its closing movement, or if it had reached the closed position at the time of the pressure surge, it will reopen a slight amount momentarily to permit the pressure surge within the inlet 5 to be dissipated. The actual volume of liquid which needs to be passed through the main valve 13 for dissipating the surge is quite small and thus overshoot of the filling level is negligible.

Reference is now directed to Fig. 5 which illustrates a modified form of the invention. While the construction here shown may be adapted to a dual diaphragm type of valve, as shown in Figs. 1 to 4, it is shown in conjunction with a single diaphragm valve. Likewise, it is apparent that the form of the invention shown in Figs. 1 to 4 can be used with the single diaphragm type valve shown in Fig. 5.

The diaphragm valve or tank filling valve shown in Fig. 5 includes a housing base 71 similar to the housing base 4 secured to a mounting flange 1. The housing base 71 receives a housing cap 72 corresponding to the housing cap 7. Interposed between the housing base and cap is a diaphragm 9, the central portion of which is clamped between a valve disc 13 and plate 15 by means of a tubular stem 16 and nut 17, as in the first described structure.

The valve disc 13 is provided with a seal ring 14 which engages a valve seat 73 at the upper end of an inlet passage 74, similar to the inlet passage 5 of the first described structure. Outwardly of the valve seat 73 the housing base 71 is provided with discharge openings 75 separated by webs which connect the upper and lower portions of the housing base 71. The diaphragm 9 is urged toward the valve seat 73 by a spring 25, as in the first described structure.

Also similar to the first described structure, the stem 16 is provided with an orifice 18 which receives a wiping pin 76. The wiping pin in this case is supported by a disc 77 held against the underside of the housing cap 72 by the spring 25. The housing base and cap are secured by bolts 78.

The diaphragm 9 forms with the housing cap 72 a pressure chamber 79 which is provided with a bleed outlet 80 communicating with a bleed line 81, which in turn is connected with a float-operated pilot valve, not shown, which is similar to one of the previously described pilot valves.

Formed at the under side of the housing base 71, at one side of the inlet passage 74, is a recess 82, the open end of which is directed downward. The recess 82 communicates with the inlet passage 74 through a passage 83. The recess is closed by a diaphragm 84 sealed in place by a cup-shaped shell 85 having a port 86 in coaxial relation with the diaphragm 84.

Secured to the diaphragm 84 by means of clamp washers 87 and a nut 88 is a stem 89 which protrudes through the port 86 and terminates in a valve head 90. A spring 91 is interposed between the shell 85 and the diaphragm 84 so as to urge the valve head 90 into sealed engagement with the outer end of the port 86. A line 92 communicates between the shell chamber 85a and the pressure chamber 79, and the passage 83 connects the relief valve with the inlet passage 74, bypassing the pressure chamber 79.

The tank filling valve herein illustrated operates in the manner of the previously described structure except that only a single diaphragm and a single pilot valve are involved. When the pilot valve is open, the pressure in the pressure chamber 79 is relieved, permitting the tank filling valve to open. On closure of the pilot valve, fluid cannot bleed from the pressure chamber, consequently the diaphragm 9 urges the seal ring 14 toward the valve seat 73 at a rate determined by the orifice 18.

Should the rate of closure be too fast the resulting pressure surge in the inlet 74 is transmitted through the passage 83 into the recess 82 to depress the diaphragm 84 so as to open the port 86. The line 92 is then vented through port 86a and hence relieves the pressure in the pressure chamber 79, so that the tank filling valve partially and momentarily reopens to relieve the peak of the pressure surge. Unless the pressure surge exceeds a value determined by the force of the spring 91, the area of the diaphragm 84 and the effective area of the valve head 90, the pressure responsive device remains closed.

While particular embodiments of this invention have been shown and described, it is not intended to limit the same to the exact details of the constructions set forth, and it embraces such changes, modifications, and equivalents of the parts and their formation and arrangement as come within the purview of the appended claims.

We claim:

1. In a tank filling valve assembly, having a main valve and a float-operated pilot valve, the improvement comprising: a valve housing constituting a portion of the main valve, the housing being provided with an inlet port and having an outlet port, a valve seat in the housing, a moveable valve device within the housing and having a port engageable with the seat for opening and closing said inlet port, means forming a pressure chamber within the housing, said valve device comprising a movable wall of the chamber, means including a restricted aperture communicating said inlet with said pressure chamber, the chamber having a vent passage of greater capacity than said restricted aperture connected to the pilot valve whereby upward movement of the float serves to close the passage and thereby initiate closing movement of the valve device toward the valve seat, a relief valve, the housing having passage means placing the relief valve in communication with the chamber and in direct communication with said inlet bypassing the chamber, whereby the relief valve opens to reduce pressure within the chamber when a pressure surge occurs in the inlet port.

2. The combination set forth in claim 1 in which said housing passage means connects the relief valve to the means including the restricted aperture which establishes communication between the inlet and the pressure chamber.

3. The combination set forth in claim 1 in which the relief valve is provided with a movable part which moves toward open position upon increase in pressure in the means including the restricted aperture.

4. The combination set forth in claim 1 in which the relief valve is provided with a movable valve part, a pressure responsive element connected to the relief valve part and subjected to pressure in the inlet, whereby the relief valve part may be moved toward open position to vent the chamber upon sudden increase in pressure in the inlet.

References Cited in the file of this patent

UNITED STATES PATENTS

| | | |
|---|---|---|
| 1,056,562 | Lombard | Mar. 18, 1913 |
| 2,224,394 | Jurs | Dec. 10, 1940 |
| 2,250,767 | Jurs | July 29, 1941 |
| 2,576,516 | Jurs | Nov. 27, 1951 |
| 2,619,108 | Sweeney | Nov. 25, 1952 |
| 2,707,965 | Allen | May 10, 1955 |
| 2,712,828 | Badger | July 12, 1955 |